United States Patent
Sonoda et al.

(10) Patent No.: US 7,869,458 B2
(45) Date of Patent: Jan. 11, 2011

(54) RELAY CONNECTION UNIT AND JUNCTION CONNECTOR

(75) Inventors: Toshiyuki Sonoda, Mie (JP); Yoshikazu Isoyama, Mie (JP); Takeo Uchino, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 885 days.

(21) Appl. No.: 11/802,520

(22) Filed: May 23, 2007

(65) Prior Publication Data
US 2007/0274328 A1    Nov. 29, 2007

(30) Foreign Application Priority Data
May 26, 2006 (JP) .............................. 2006-147151

(51) Int. Cl.
*H04J 15/00* (2006.01)
(52) U.S. Cl. ...................................................... 370/464
(58) Field of Classification Search ......... 370/464–466, 370/498, 535, 901, 902, 908; 701/33, 36, 701/48; 709/223, 249
See application file for complete search history.

(56) References Cited

U.S. PATENT DOCUMENTS

| | | | | |
|---|---|---|---|---|
| 5,623,169 A * | 4/1997 | Sugimoto et al. | ........... | 307/10.1 |
| 5,699,250 A * | 12/1997 | Kobayashi | .................... | 701/48 |
| 6,291,770 B1 * | 9/2001 | Casperson | ................ | 174/72 A |
| 6,434,459 B2 * | 8/2002 | Wong et al. | .................... | 701/36 |
| 6,484,082 B1 * | 11/2002 | Millsap et al. | ................ | 701/48 |
| 6,629,032 B2 * | 9/2003 | Akiyama | ...................... | 701/48 |
| 6,909,944 B2 * | 6/2005 | Pillar et al. | ..................... | 701/1 |
| 6,994,562 B2 * | 2/2006 | Suzuki et al. | ................. | 439/61 |
| 2006/0161269 A1 * | 7/2006 | Staiger | ........................ | 700/20 |

FOREIGN PATENT DOCUMENTS

JP    A 2006-67543    3/2006

\* cited by examiner

*Primary Examiner*—Dmitry H Levitan
(74) *Attorney, Agent, or Firm*—Oliff & Berridge, PLC (57) ABSTRACT

This invention provides a relay connection unit that relay message and make sufficient number of branches to be able to connect a plurality of ECUs. The relay connection unit includes: reception connectors to which a plurality of insertion connectors of communication lines can respectively be connected; a branch connection unit that divides the reception connectors into a plurality of groups, the branch connection unit branch-connecting the communication lines through the reception connectors belonging to the respective groups; a plurality of vehicle-mounted LAN communication units respectively connecting to each of the groups of the reception connectors via the branch connection unit, which are configured to perform transmission/reception of messages; and a relay processing unit that relays an incoming message received via one of the vehicle-mounted LAN communication units to another of the vehicle-mounted LAN communication units of another relay connection unit in accordance with a relaying destination.

6 Claims, 12 Drawing Sheets

RELAY CONNECTION UNIT AND JUNCTION CONNECTOR

This application is based on and claims the benefit of priority from the prior Japanese Patent Application No. 2006-147151, filed on May 26, 2006, the entire content of which is hereby incorporated by reference.

BACKGROUND OF THE INVENTION

1. Technical Field

The present invention relates to a relay connection unit and a junction connector. More particularly, the present invention relates to a relay connection unit and a junction connector that can improve the routing of communication lines and increase reliability within a vehicle-mounted LAN system.

2. Background Art

In recent years, numerous Electronic Control Units (ECUs) have come to be mounted in automobiles, and the number thereof tends to increase. Respective ECUs are interconnected to each other via communication lines to constitute a vehicle-mounted LAN, and are configured to provide a capability of sending and receiving messages among the ECUs. Furthermore, in order to reduce the amount of messages being transmitted via each of the communication lines, a plurality of the communication lines are connected via a relay connection unit to reduce the number of ECUs connected to a single communication line (one segment of the vehicle-mounted LAN). Further, Patent Document 1: Japanese Patent Unexamined Publication JP-A-2006-67543 discloses a configuration of a junction connector which allows a plurality of communication lines to be connected to a single communication line which constitutes a trunk line.

Figure 11:
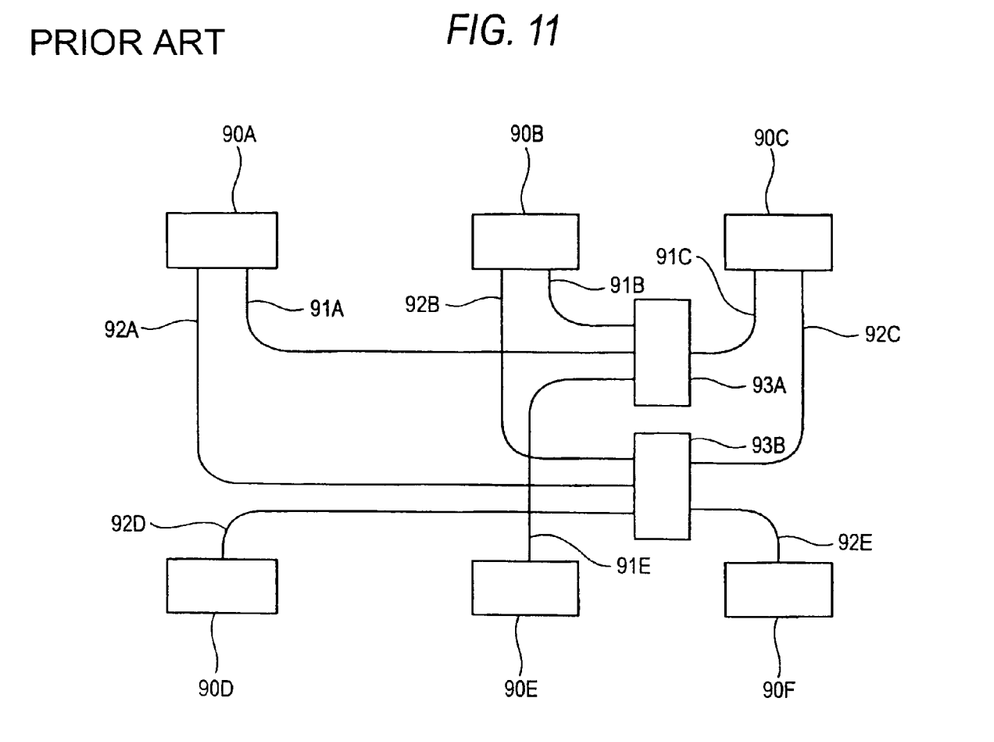
FIG. 11 is a diagram illustrating a configuration of the vehicle-mounted LAN using a background art junction connector.

FIG. 11 shows an exemplary vehicle-mounted LAN built using the aforementioned junction connectors. 90A, 90B . . . represent ECUs mounted on a vehicle. 91A, 91B . . . , 92A, 92B . . . represent communication lines made of twisted pair cables which is compliant with a vehicle-mounted LAN standard such as CAN or the like, connecting between the ECUs 90A, 90B . . . 93A and 93B represent the junction connectors. These ECUs 90A, 90B . . . constitute a first segment of the vehicle-mounted LAN that can mutually transmit and receive messages by respective the communication lines 91A and 91B, the junction connector 93A, and a second segment of the vehicle-mounted LAN with the communication lines 92A and 92B, and the junction connector 93B. In the description blow, each of the members 90A, . . . 91A, . . . 92A, . . . 93A, . . . are respectively indicated by the numerals 90, 91, 92, 93 unless specific distinctions are required.

When the vehicle-mounted LAN so-configured is built, by forming each segment accordingly, and by transmitting/receiving messages accordingly through the selection of the communication lines 91, 92, all the ECUs 90 can transmit/receive messages to/from any of the other ECUs 90. Further, by dividing the junction connectors 93 into groups, one for each of logic paths of the ECUs 90, it is possible to suppress the communication load factor in each communication line 91. Each of gateways 94A, 94B is also represented herein by a reference numeral 94 unless a specific distinction is required.

Figure 12:
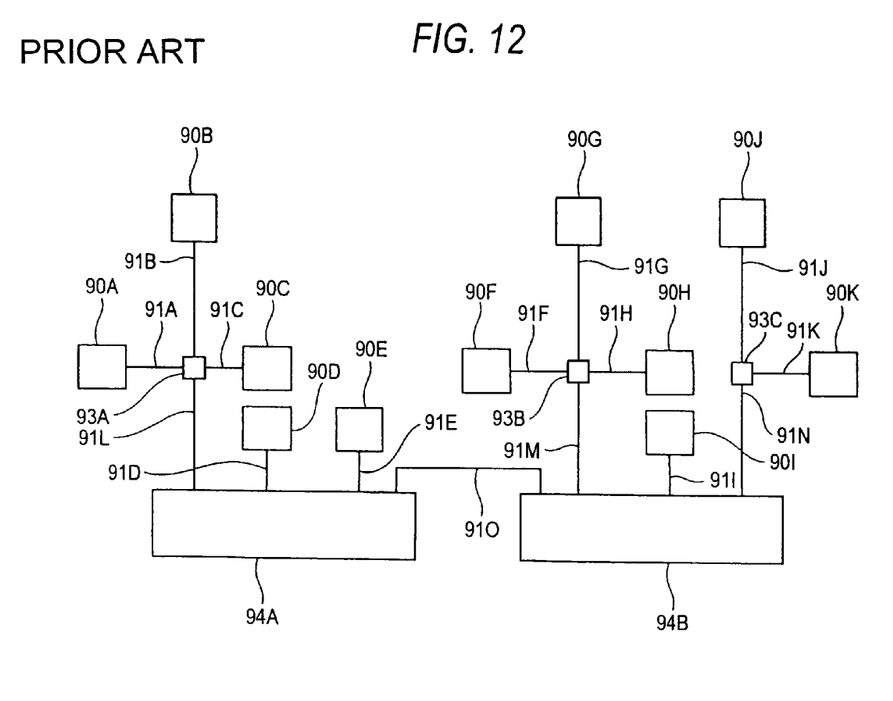
FIG. 12 is a diagram illustrating a configuration of the vehicle-mounted LAN using a background art relay connection unit.

FIG. 12 indicates a configuration of a vehicle-mounted LAN further using the gateways 94A, 94B. That is, by connecting the junction connectors 93 to the gateways 94A, 94B, and connecting between the respective gateways 94A, 94B using a communication line 910 as a trunk line, each of the ECUs 90 may be able to transmit/receive messages to/from all the ECUs 90 just by being connected to the vehicle-mounted LAN, using at least one communication line 91.

When the vehicle-mounted LAN is configured as the above, by placing the gateways 94A, 94B apart from each other, any ECUs 90 may be connected, via the nearest relay connection unit 94, to each of the ECUs 90 constituting the vehicle-mounted LAN. Thus, the length of each communication line 91 may be reduced. Furthermore, the relay connection unit 93 has communication ports to be connected to four communication lines 91 respectively so as to allow the reduction in the number of ECUs 90 connected to one communication port. Thus, it is capable of reducing the amount of messages relayed by the relay connection unit 93 to each of the communication lines 91. Accordingly, it is possible to reduce the communication load factor in each of the communication lines 91. Further, by using the junction connectors of the Patent Document 1, ringing in the communication lines 91 may be prevented so that the length of the communication lines 91 may be increased to that extent.

However, in the vehicle-mounted LAN configured as shown in FIG. 11, the transmission/reception of messages must be enabled by connecting a plurality of communication lines 91, 92 to a single ECU 90. Thus, it requires not only a larger number of communication lines 91, 92 but also requires each ECU 90 to perform separate communications using a plurality of communication lines 91, 92. Furthermore, a plurality of ECUs 90 are directly connected to each of the junction connectors 93A, 93B, and some of the ECUs 90 are connected to both the junction connectors 93A, 93B. Thus, it has been difficult to freely configure the locations of the ECUs 90.

On the other hand, in the vehicle-mounted LAN configured as shown in FIG. 12, there are a large number of ECUs 90 relative to the number of reception connectors provided to the gateways 94 for connecting the communication lines 91. Thus, there has been necessity that a plurality of the ECUs 90 had to be branch-connected to one communication port using a junction connector 93 in a case where all the ECUs 90 cannot be connected to the reception connectors on one-on-one basis. Accordingly, besides the relay connection unit 92, the junction connectors 93A to 93C and communication lines 91L to 91N for connecting between the junction connectors 93A-93C and the gateways 94 have been needed.

Furthermore, the use of the junction connectors 93 described in Patent Document 1 may reduce the ringing in the communication lines 91. However, there is a limit in the lengths of the communication lines 91, 92 connected to the junction connectors 93, making it difficult to freely arrange the locations of the ECUs 90.

SUMMARY OF THE INVENTION

The present invention has been achieved in view of the above problems, and an object thereof is to provide a relay connection unit that performs relaying of messages as well as providing sufficient number of branching, thus to allow connection of a large number of ECUs.

In order to solve the above problems, the present invention provides a relay connection unit includes reception connectors to which a plurality of insertion connectors of communication lines can respectively be connected, a branch connection unit that divides the reception connectors into a plurality of groups, the branch connection unit branch-connecting the communication lines through the reception connectors belonging to the respective groups, a plurality of vehicle-mounted LAN communication units respectively connected to each of the groups of the reception connectors via the branch connection unit, which are configured to perform transmission/reception of messages, and a relay processing unit that relays an incoming message received via one of the vehicle-mounted LAN communication units to another of the vehicle-mounted LAN communication units in accordance with a relaying destination.

In the relay connection unit configured in the above manner, the respective reception connectors are divided into groups having the number corresponding to the number of the vehicle-mounted LAN communication units. The communication lines connected to the reception connectors that belong to each of the groups are branch-connected to a vehicle-mounted LAN communication unit via the branch connection unit. Thus, mutual transmission/reception of a message is possible between each of the ECUs connected via each of the communication lines belonging to a single group. Further, when the relay connection unit receives a message via a reception connector branch-connected to one vehicle-mounted LAN communication unit and an ECU that receives this message is connected via a reception connector branch-connected to another vehicle-mounted LAN communication unit, the relaying of this message is performed by the relay processing unit. Accordingly, all the ECUs connected to the communication ports can mutually transmit/receive messages.

The relay connection unit of the invention may be a unit dedicated to relay processing of messages such as a gateway, but it may also be an electronically controlled device such as an ECU provided with a message relay function. The reception connectors preferably have impedance that matches to characteristic impedance of the communication lines to prevent reflection at the reception connectors between the communication lines and the reception connectors.

Furthermore, the branch connection unit may be provided with passive branches branch-connecting the respective communication lines. It may also be one that reliably provides impedance matching at its branches using active elements. The vehicle-mounted LAN communication units perform transmission/reception of messages in conformance to various standards for vehicle-mounted LAN such as CAN, FlexRay, LIN or the like. In addition, a mixture of the vehicle-mounted LAN communication units that comply with a plurality of vehicle-mounted LAN standards may exist.

It is preferable that the relay processing unit includes a logic circuit which, in order to perform the relaying of messages in parallel, includes relay information recording units for buffering a message to be relayed and indicating the relationship between identification information of the message to be relayed and the vehicle-mounted LAN communication units as a relay destination, and a comparator for comparing the identification information of each message with the identification information stored within the relay information recording units. However, the relay processing may be performed through software process.

The relay connection unit has a sufficient number of reception connector by using the relay connection unit of the invention. Thus, it is possible to connect ECUs to reception connectors on one-on-one basis using a single communication line. Accordingly, it does not require branching of communication lines using separate junction connectors as done in the background art, thereby allowing simplification of the vehicle-mounted LAN configuration. It also realizes the suppression of ringing caused by impedance mismatch that would otherwise be incurred at a section to which a separate junction connector is attached to a single communication line, thus more stable communication may be performed to that extent.

It is preferable that the branch connection unit is a matrix circuit in which switching circuits are arranged in lines between first conductors connected to the reception connectors and second conductors connected to the vehicle-mounted LAN communication units, the switching circuits being configurable to pass/block electrical signals bi-directionally.

According to the above configuration, through the setting of each of the switching circuits within the matrix circuit, the grouping of the reception connectors can be done flexibly. Accordingly, after manufacturing relay connection units having the same circuit configuration, it is possible to group each of the reception connectors arbitrarily by simply setting the connection statuses of the switching circuits. Thus, manufacturing cost may be minimized through the common architecture of the relay connection units. In addition, since the first conductors, the second conductors and the matrix circuit may easily be formed within a single semiconductor integrated circuit, it is possible to achieve miniaturization of the relay connection units. In this case, since it is also possible to form the branch connection unit, the vehicle-mounted LAN communication units and the relay processing unit all on a single semiconductor integrated circuit, further miniaturization is possible.

The switching circuits are something like analog switches, and can be contemplated as ones to make the first and second conductors in electrical communication thus to either allow electrical signals to pass bi-directionally between the conductors, or block them. When the switching circuits are comprised of a combination of receiver and transmitter circuits, it is possible to reliably prevent the occurrence of ringing due to impedance mismatch by eliminating passive branches. Furthermore, the switching circuits are respectively provided to each of the first conductors, and are preferably selectable between a state where the first conductors are all disconnected from the second conductors, and a state where electrical signals are bi-directionally communicated between a first conductor and a predetermined one of the second conductors and any electrical signals between the first conductor and the other conductors are blocked.

It is preferable that the relay connection unit further includes a connection adjustment unit that monitors communication status of messages via the second conductors, and the connection adjustment unit changing the setting of corresponding one of the switching circuits to dynamically adjust groupings of the reception connectors when the status of communications using any of the second conductors degrades.

By the aforementioned configuration, the amount of messages transmitted/received using any of the communication lines connected to any of the second conductors increases. When its communication load factor becomes so high such as to cause degradation of the communication status, the connection adjustment unit monitors such the status, and reviews the grouping before a communication failure occurs in the message transmission/reception which uses the second conductor, in order to attempt the equalization of communication load factors of respective parts. When any one of the ECUs transmitting/receiving messages via the second conductors outputs an abnormal signal that does not meet the vehicle-mounted LAN standard, thus to promote an adverse effect to the other ECUs within the same group, the connection adjustment unit disconnects the first conductor connected to the ECUs promoting the adverse effect from the second conductor, thereby preventing the adverse effect from spreading within the group.

An ECU sending an important message may be connected to the relay connection unit via a plurality of communication lines using a plurality of reception connectors. Thus, even when a problem occurs to the message communication over the each communication line, the connection adjustment unit can readjust the grouping in such a manner that the message transmission/reception can be done via a healthier communication line, making it possible to minimize the adverse effect caused by the communication problem.

It is preferable that the branch connection unit is a conductor for branch-connecting between the vehicle-mounted LAN communication unit and the reception connectors within the groups By the aforementioned configuration, the configuration of the branch connection unit may be made as simple as possible, and the manufacturing cost thereof may be reduced. Furthermore, in the present case, it is preferable to form a reception connector module in which the conductors constituting the branch connection unit are integrally formed with the reception connectors, by integrating the conductors constituting the branch connection unit and the reception connectors. That is, as for the reception connector module, there may be provided a plurality of branching patterns that are adapted to the environments of particular vehicle-mounted LAN to which the relay connection unit is to be attached. Reception connector modules may selectively be connected to a substrate having the vehicle-mounted LAN communication means and the relay processing unit formed thereon.

It is preferable that the relay connection unit further includes a connector provided between the branch connection unit and the vehicle-mounted LAN communication unit, the connector allowing the reception connectors and the branch connection unit to be connected and disconnected with respect to the vehicle-mounted LAN communication unit and the relay processing unit.

By the aforementioned configuration, the reception connector module including the reception connectors and the branch connection unit can be connected and disconnected to and from the body of the relay connection unit including the vehicle-mounted LAN communication units and the relay processing unit. Thus, the reception connector module may be replaced to accommodate a vehicle-mounted LAN under a different environment.

The present invention provides a junction connector including reception connectors to which a plurality of insertion connectors of communication lines can respectively be connected, a branch connection unit that divides the reception connectors into a plurality of groups, the branch connection unit branch-connecting the communication lines through the reception connectors belonging to the respective groups, and unit-side insertion connectors branch-connected to the respective groups of the reception connectors via the branch connection unit, and being formed so as to match the number of a plurality of unit-side reception connectors provided on a relay connection unit, and being configured so as to be capable of being connected to the unit-side reception connectors in a batch.

The junction connector having the aforementioned configuration is capable of being connected, in a batch, to the unit-side reception connectors of the relay connection unit, and has a large number of reception connectors divided into a number of groups. Accordingly, when any insufficiency occurs in the number of the unit-side reception connectors formed within the relay connection unit, the junction connector of the invention may be connected to the unit-side reception connectors to increase the number of the reception connectors.

Furthermore, the branch connection unit is connected by a connector joint directly to the unit-side reception connector of the relay connection unit making the distance between branching points of communication lines and the reception connectors extremely short. Thus, even if reflection occurs due to impedance mismatch at a branch of the communication line, ringing between the branch and a corresponding reception connector less likely occurs. Therefore, more stable communication may be achieved. It is also possible, by interposing receivers and drivers in the branch connection unit, impedance matching may adequately be achieved at the sections where the respective reception connectors are provided.

A relay connection unit of the present invention has an enough number of reception connectors so that an ECU may be connected to a reception connector using a single communication line on one-on-one basis. Accordingly, it is not necessary to make branches of the communication line through the use of separate junction connectors as previously necessitated, and the configuration of a vehicle-mounted LAN may be simplified. Compared with a case where the branching is achieved by attaching a separate junction connector to a single communication line, the number of communication lines may be reduced. Furthermore, occurrence of ringing due to impedance mismatch at a section of a single communication line where a separate junction connector is attached may be minimized, and to that extent, allowing the communication to be stable.

In a vehicle-mounted LAN constructed using the relay connection unit of the invention, since the relay connection unit connects each of the reception connectors after grouping them, ECUs do not need to be connected respectively to the vehicle-mounted LAN constituting a plurality of logic circuits. Thus, the configuration of the ECUs may be simplified.

Further, since the relay connection unit has a sufficient number of reception connectors, it has good scalability, and a number of the vehicle-mounted LAN communication units subject to the relay processing by the relay processing unit may be minimized. Thus, it may be manufactured inexpensively.

BRIEF DESCRIPTION OF THE DRAWINGS

The advantages, nature, and various additional features of the invention will appear more fully upon consideration of the exemplary embodiments. The exemplary embodiments are set forth in the following drawings.

DESCRIPTION OF THE EXEMPLARY EMBODIMENTS

Hereinafter, exemplary embodiments of a relay connection unit 1 according to the present invention will be explained with reference to the drawings, the following exemplary embodiments do not limit the scope of the invention.

Figure 1:
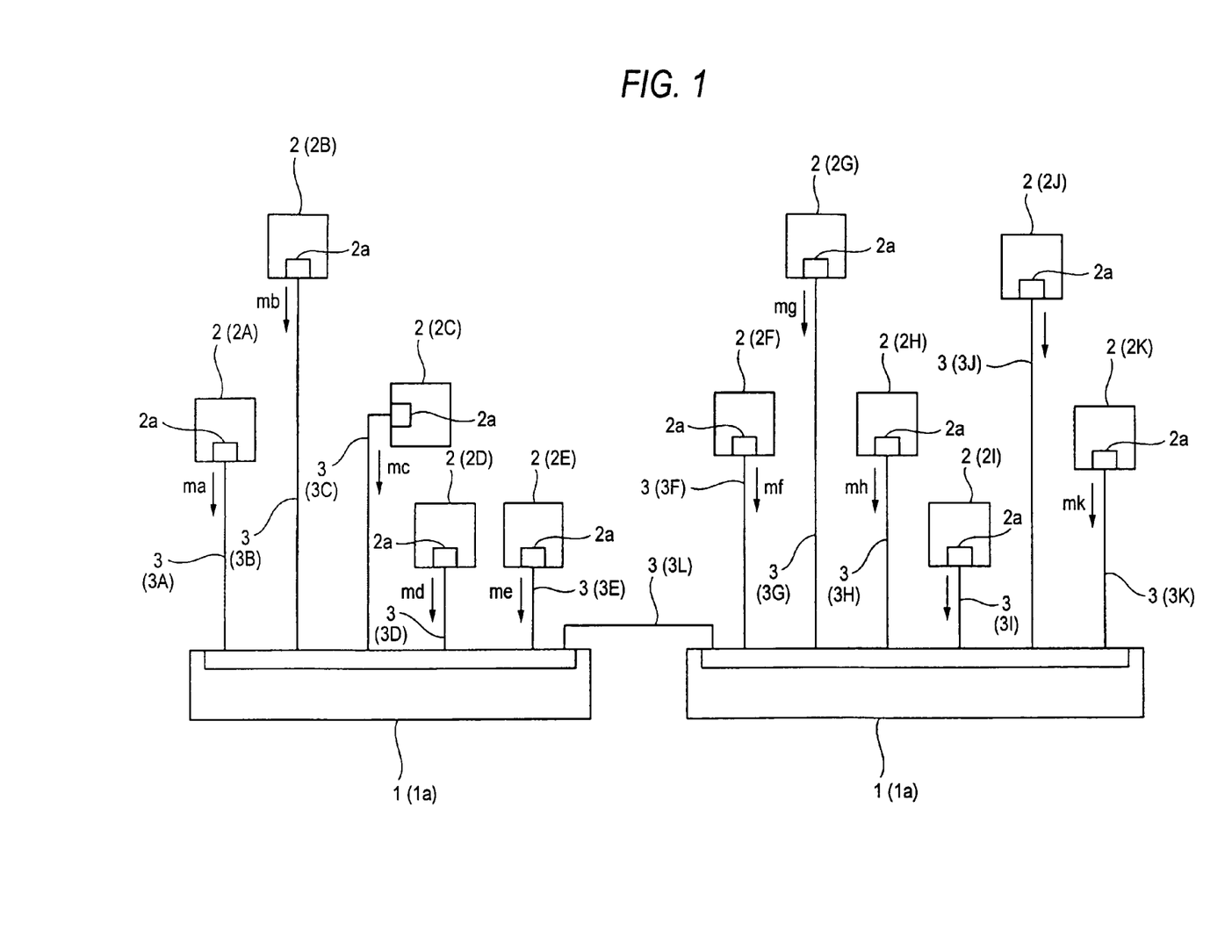
FIG. 1 is a block diagram of a vehicle-mounted LAN using a relay connection unit of the invention.
Figure 2:
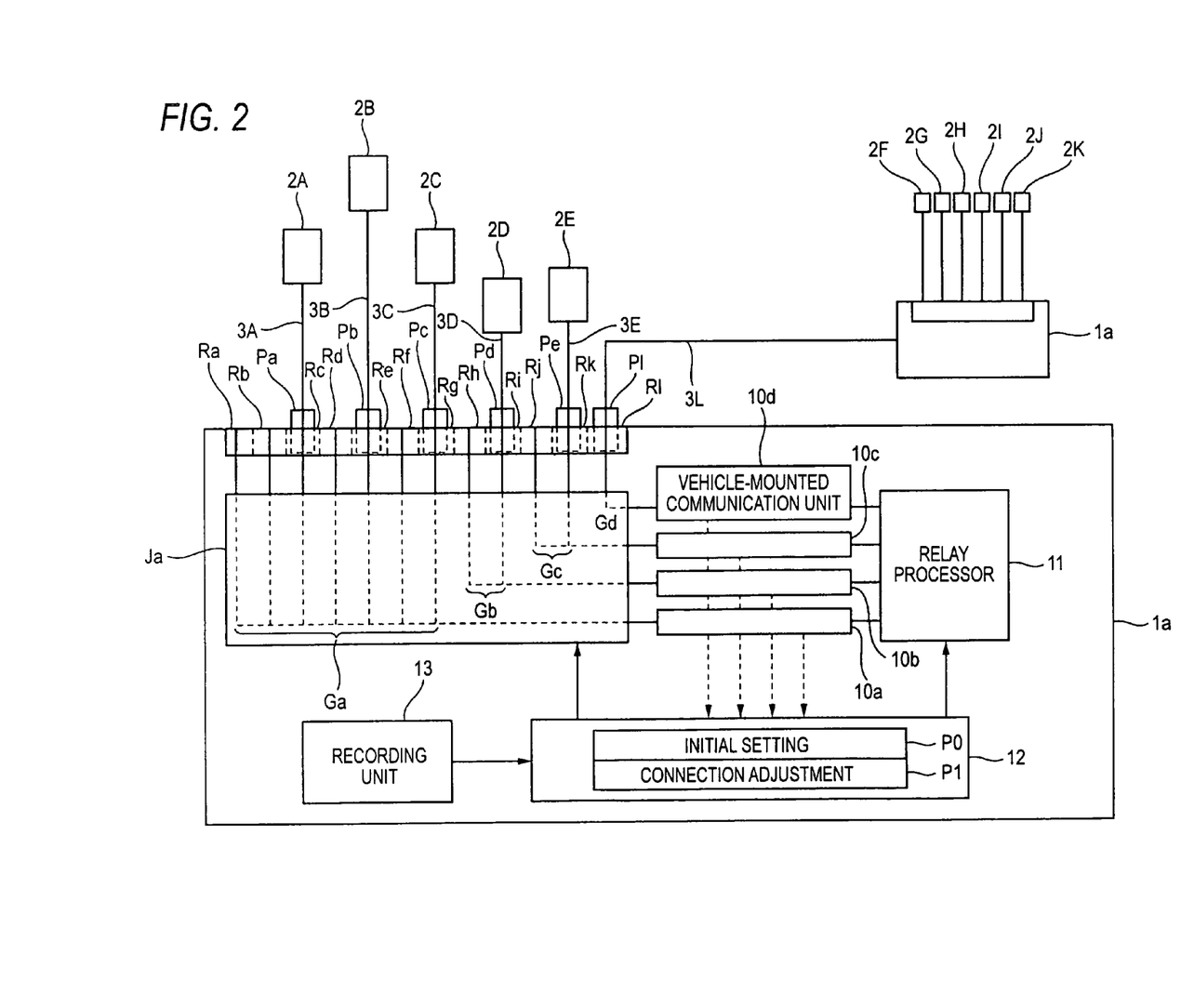
FIG. 2 is a block diagram of a relay connection unit according to the first embodiment of the invention.
Figure 3:
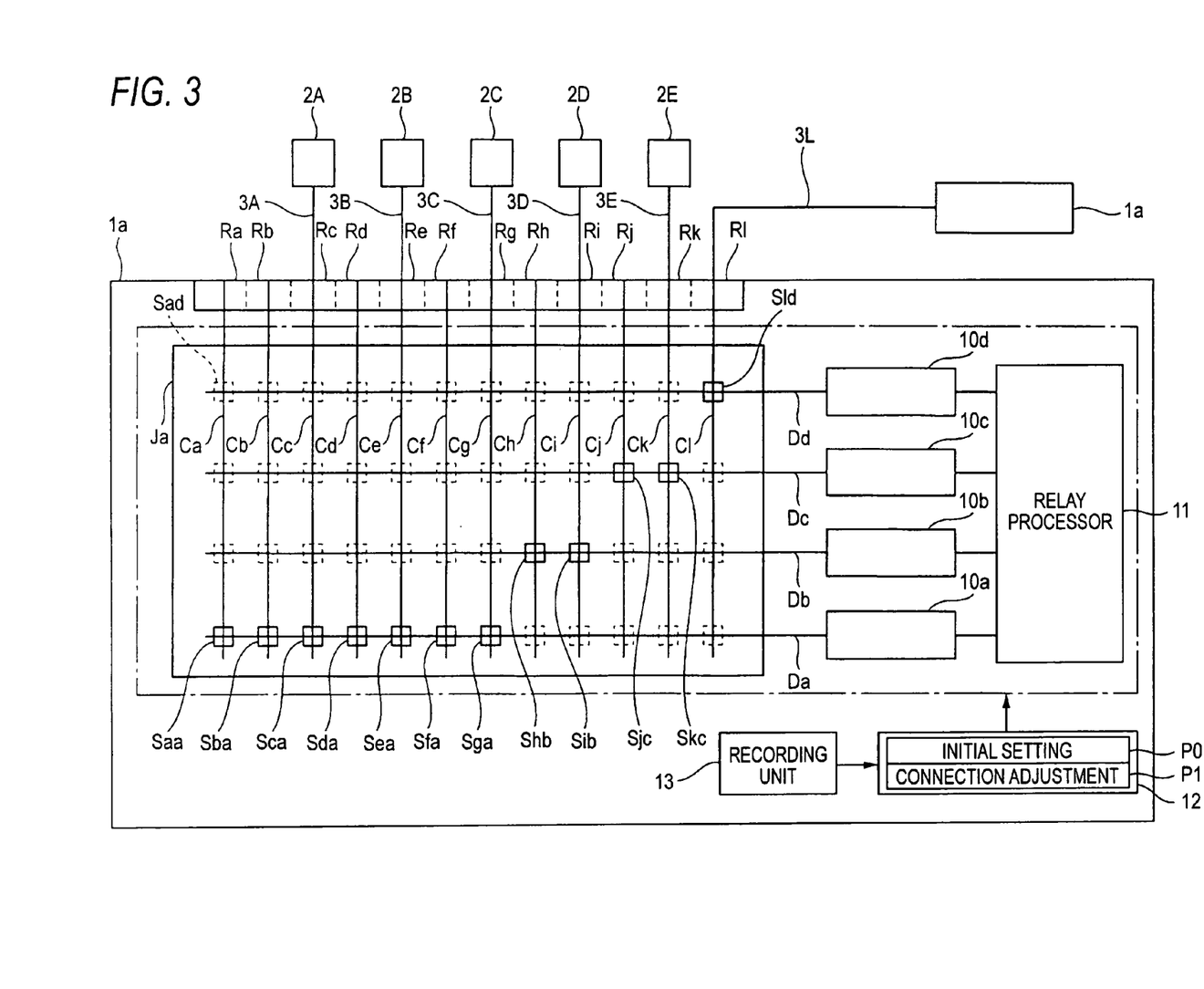
FIG. 3 is a diagram showing more detailed internal configuration of the relay connection unit.
Figure 4:
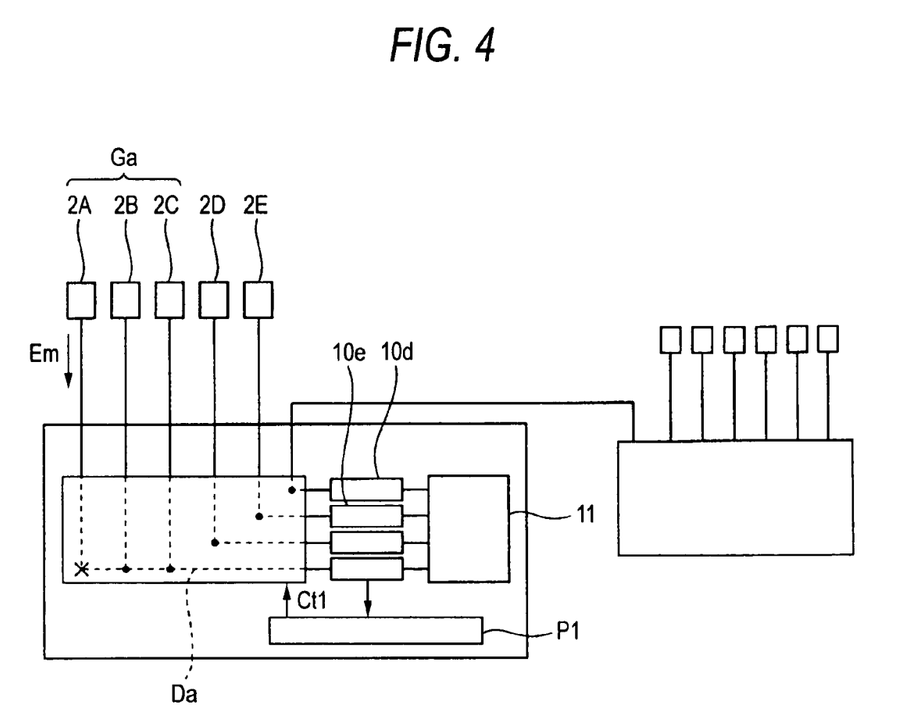
FIG. 4 is a diagram illustrating an operation of the relay connection unit.
Figure 5:
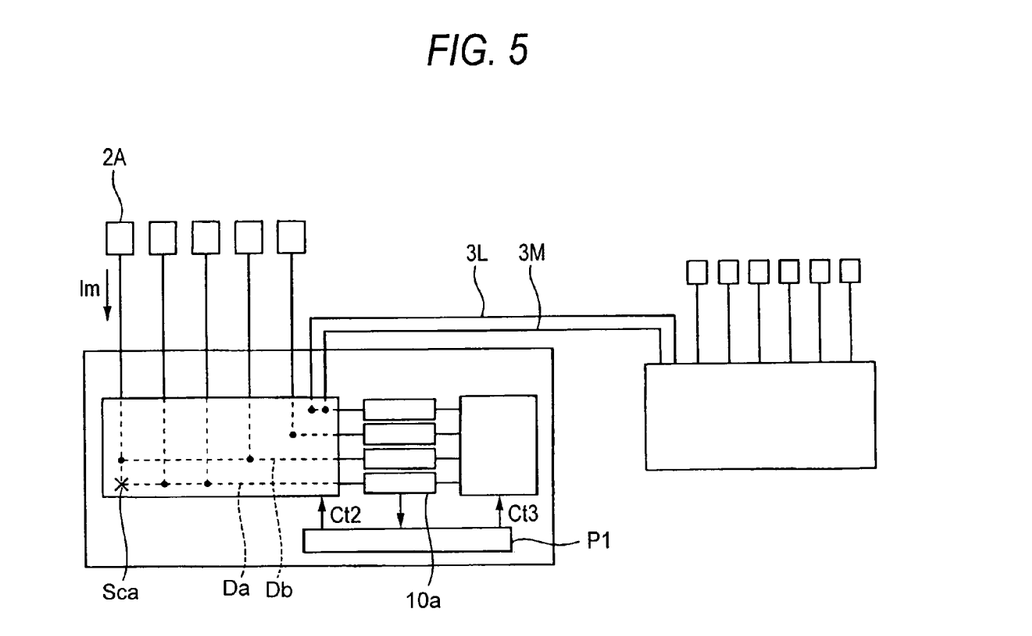
FIG. 5 is a diagram illustrating another operation of the relay connection unit.

FIGS. 1 to 5 are views for explaining a first embodiment of the invention. FIG. 1 shows a configuration of a vehicle-mounted LAN using a relay connection unit 1 according to a first embodiment (the relay connection unit 1 of the first embodiment is hereinafter represented by a reference numeral "1a"). FIG. 2 is a block diagram showing inside the relay connection unit 1a on a conceptual basis. FIG. 3 is a block diagram showing more specific configuration of the inside of the relay connection unit 1a. FIGS. 4 and 5 are diagrams explaining the operation of the relay connection unit 1a.

In FIG. 1, reference numeral "2" represents ECUs (hereinafter, when each ECU 2 is separately referred, reference numerals "2A, 2B . . . " are used) connected to the relay connection unit 1a. Reference numeral "3" represents communication lines (hereinafter, when each communication line 3 is separately referred, reference numerals "3A, 3B . . . " are used) for connecting the relay connection unit 1a.

The ECUs 2 . . . respectively include vehicle-mounted LAN communication units 2a for transmitting/receiving messages ma, mb . . . which comply with i.e. CAN standard, and the communication lines 3 are twisted pair cables which comply with the CAN standard. In the present embodiment, all the communication lines 3A, 3B . . . transmit/receive messages at a communication speed of 500 kps. Further, each of the communication lines 3A, 3B . . . may form a vehicle-mounted LAN which complies with various standards such as LIN, CAN, Flex Ray (Registered trademark), MOST, D2B, IDB1394, Ethernet (Registered trademark) or the like. In addition, a vehicle-mounted LAN may be constructed using communication lines 3 each having a different standard and/or a different communication speed.

The two relay connection units 1 shown in FIG. 1 are connected via a communication line 3L. Accordingly, they are configured to be able to transmit/receive messages m between ECUs 2A to 2E and ECUs 2F to 2K. With regard to ECUs 2A to 2E and ECUs 2F to 2K, by suitably dividing them in accordance with their positions, and connecting them to near-by relay connection units 1, it is possible to transmit/receive messages m between all of the ECUs 2.

As shown in FIG. 2, the relay connection unit 1a of the invention includes: reception connectors Ra to Rl capable of respectively connecting the insertion connector Pa, Pb . . . Pl of a plurality of communication lines 3A, 3B . . . 3L; a branch connection unit Ja which divides the reception connectors Ra to Rl (where it is not necessary to make distinction, they will hereinafter be referred to as "reception connector(s) R") into a plurality of groups Ga to Gd and branch-connects the communication lines 3A, 3B . . . ; ports 10a to 10d (where it is not necessary to make distinction, they will hereinafter be referred to as "port(s) 10") including vehicle-mounted LAN communication units each connected to each of the groups Ga, Gb . . . of the reception connectors Ra, Rb . . . via the branch connection unit Ja, and transmitting/receiving the messages ma, mb . . . (where it is not necessary to make distinction, they will hereinafter be referred by a reference symbol "m"); a relay processor 11 connected to the ports 10a to 10d to perform relaying processes of the messages m; a CPU 12 controlling the relay processor 11 to manage the relaying processes; and a recording unit 13 storing an operation program of the CPU 12 and preset values of the relay processor 11. The present embodiment describes the configuration of the relay connection unit 1a as having four of the ports 10. However, it should be understood that the invention is not limited to the number of the ports 10.

The branch connection unit Ja includes a memory-mixed logic IC such as a Filed Programmable Gate Array (FPGA) or the like, and by having the necessary information written thereto, it is configured to be capable of arbitrarily dividing the reception connectors Ra, Rb . . . into the groups Ga, Gb . . . (the details of which will later be described).

The ports 10a to 10d are configured to be independently operable. Each of the ports 10a to 10d are connected respectively to sets of the communication lines 3A-3C, 3D, 3E, 3L respectively constituting the groups Ga-Gd via the branch connection unit Ja. That is, each of the groups Ga, Gb . . . of the reception connectors respectively constitutes a segment of the vehicle-mounted LAN.

The relay processor 11 is comprised of a memory-mixed logic IC such as FPGA or the like, on which a logic circuit for relaying messages m is recorded, and it includes a plurality of functional blocks (IP: Intellectual Property) formed by being written with necessary information, and performs parallel processing of relaying of a plurality of messages m. Although in the present embodiment, the relay processor 11 is formed using an FPGA to increase its versatility, the relay processor 11 may also be formed using a custom IC such as ASIC (Application Specific Integrated Circuit) to form the functional blocks in a fixed manner. In contrast, the relaying process within the relay processor 11 may be realized by software.

By writing data for forming the functional blocks in the memory-mixed logic IC, the CPU 12 makes this memory-mixed logic IC function as the relay processor 11 that provides adequate relay processes by hardware. Further, it monitors the status of communication by the ports 10, and controls the relaying performed by the relay processor 11.

The recording unit 13 is a nonvolatile ROM. The ROM 13 stores, as preset values for the branch connection unit Ja and the relay processor 11, data representing the functional blocks described in a hardware language or the like to be read out by the CPU 12 and written into the branch connection unit Ja and the relay processor 11. The ROM 13 further stores a control program for the CPU 12 to control the status of the communication through the ports 10 and relay processor 11. However, when the formation of the functional blocks are done in a fixed manner at the time of manufacture, and the functional blocks are not formed within the memory-mixed logic IC at the start-up of the relay connection unit 1a, it is not necessary for the ROM 13 to have the data to make the memory-mixed logic IC function as the relay processor 11.

In the present embodiment, for the convenience of description, the branch connection unit Ja, ports 10a to 10d, and the relay processor 11 are shown separately. However, these may be formed within a single logic IC. Furthermore, by integrating the CPU 12 and the ROM 13, each of the members Ja and 10 to 13 may be formed on a single chip.

Next, using FIG. 3, further details of the configuration of the relay connection unit 1a of the present embodiment is shown. As can be seen in FIG. 3, the branch connection unit Ja is a matrix circuit including first conductors Ca to Cl connected to the reception connectors Ra to Rl, second conductors Da to Dd connected respectively to the ports 10a to 10d, and switching circuits Saa to Sld arranged in a matrix so as to be capable of passing bi-directionally, or blocking electrical signals between the first conductors Ca to Cl and the second conductors. In the description below, where it is not necessary to make distinction among the individual conductors Ca to Cl, Da to Dd and the switching circuits Saa to Sld, they are referred by reference symbols C, D and S respectively.

The switching circuits S shown in this embodiment are analog switches, and those switching circuits Saa to Sga, Sha, Sia, Sjc, Skc and Sld drawn by solid lines in FIG. 3 have been set to pass electrical signals between the conductors C and D bi-directionally. The other switching circuits S drawn by dotted lines have been set to block electrical signals between the conductors C and D. Based on the so-configured branch connection unit Ja, the reception connectors may be divided into sets Ra- to Rg, Rh, Ri, Rj, Rk and Rl belonging to the groups Ga, Gb, Gc and Gd respectively. Further, by interposing receivers and drivers to the switching circuits S, impedance match at each of the first conductors C may be achieved unfailingly.

The CPU 12 executes the program P0 for initializing the relay processor 11 which has previously been explained, and connection adjustment program P1 which allows changing of the setting of the switching circuits S.

The connection adjustment program P1 is stored on the ROM 13 that functions as the connection adjustment unit through the execution by the CPU 12. The connection adjustment unit P1 is not necessarily a software program executed by the CPU 12. It may also be a functional block of hardware. In this case, it is possible to form it within the memory-mixed logic IC that constitutes the branch connection unit Ja and the relay processor 11. Accordingly, in the description below, it is referred to as the connection adjustment unit P1.

The connection adjustment unit P1 monitors the status of massage communication via the second conductors Da to Dd that are connected to the respective ports 10a to 10d. When the status of the communication using any of the second conductors Da to Dd degrades, it changes the settings of the switching circuits S to dynamically adjust the grouping Ga to Gd of the reception connectors.

Operation of the relay connection unit with the above-mentioned architecture will now be explained. The relay connection unit 1a of the embodiment includes a sufficient number of reception connectors R. Accordingly, by connecting respective insertion connectors Pa, Pb . . . to these reception connectors R, ECUs 2A, 2B . . . can be connected to the relay connection unit 1a on one-on-one basis.

Further, in the state shown in this embodiment, there are provided the twelve reception connectors R, and the reception connectors Ra to Rg belong to a single group Ga. Accordingly, each of the communication lines 3A to 3C is branch-connected to the port 10a trough one of the insertion connectors Pa to Pc connected to one of the reception connectors Ra to Rg, so that these communication lines 3A to 3C and ECUs 2A to 2C will come to constitute one segment of the vehicle-mounted LAN, and they can transmit/receive messages bi-directionally without requiring the intervention of the relay processor 11. In this case, there is no need for providing branches in the communication lines 3A to 3C, which connect the respective ECUs 2A to 2C to the relay connection unit 1a, so that stable transmission/reception of messages m may be achieved.

Furthermore, among the reception connectors Ra to Rg belonging to the same group Ga, there are the reception connectors Ra, Rb, Rd and Rf not connected yet, so that it is possible to connect other ECUs 2 within the same segment using these connectors. To put it another way, it is superior in scalability. The invention, however, is not limited to providing spares to the reception connectors Ra and Rb.

FIG. 4 is a diagram illustrating the operation of the connection adjustment unit. As shown in FIG. 4, when one of the ECUs 2 connected to the reception connectors Ra to Rg belonging to the same group Ga is transmitting an erroneous message Em that may cause adverse effect on the other ECUs 2B, 2C, the connection adjustment unit P1 monitors the port 10a to monitor the communication status of messages m via the second conductor Da, and confirms the influence of the erroneous message Em. Then, it outputs a control signal Ct1 to switch the switching circuit Sca into a block state. In this way, the influence of the erroneous message may be prevented from affecting the other ECUs 2B, 2C.

FIG. 5 is a diagram illustrating another operation of the connection adjustment unit P1. As shown in FIG. 5, when one ECU 2A connected to a reception connector Ra to Rg belonging to the group Ga is transmitting many image messages Im such as image information, increasing the communication load factor within this segment, the connection adjustment unit P1 monitors the port 10a to monitor the communication status of the messages m transmitted via the second conductor Da, and detects that the communication load factor thereof is about to exceed its threshold value.

Thereafter, the connection adjustment unit P1 blocks the switch Sca so as to connect the ECU 2A to another second conductor Db which has more margin in its traffic and outputs a control signal Ct2 which turns the switching circuit Scb to be a transmitting state, as well as a control signal Ct3 which rewrites the relay information of the image messages Im to the relay processing unit. This can solve the problem of the temporal increase in the communication load factor to cause communication failures of other messages m within the group.

As mentioned above, by dynamically adjusting the grouping within the relay connection unit 1a by the branch connection unit Ja, the relay connection unit 1a can more flexibly relay messages m in accordance with the state of the vehicle-mounted LAN. Furthermore, a plurality of communication lines 3L and 3M may be wired to a portion performing an important transmission, to be able to flexibly accommodate the increase in the communication traffic, and also to increase the reliability by preventing outage due to communication failures.

Figure 6:
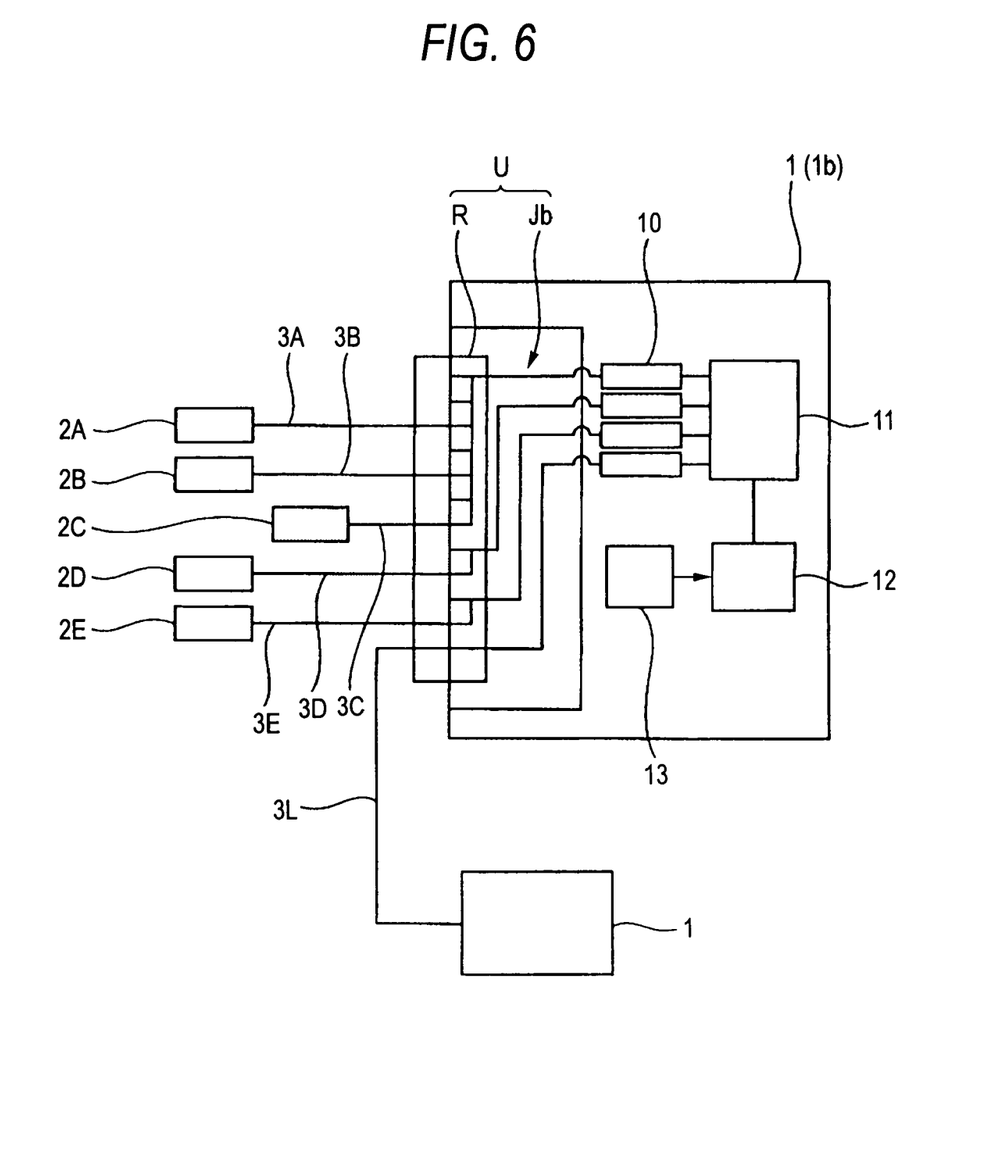
FIG. 6 is a diagram showing configuration of a relay connection unit of the second embodiment of the invention.

FIGS. 6 and 7 are diagrams illustrating a second embodiment of the relay connection unit 1 of the invention (when the relay connection unit is referred in the context of the second embodiment, it is hereinafter referred by a reference numeral "1b"). The relay connection unit 1b of this embodiment differs from the relay connection unit 1a shown in FIGS. 1 to 5, in the fact that the branch connection unit Jb is a set of conductors which branch-connect between the reception connectors R and the vehicle-mounted LAN communication units 10. Since the branch connection unit Jb of the present embodiment is a set of conductors, the architecture of the branch sections is extremely simple. Thus, the manufacturing cost may be reduced.

Figure 7A:
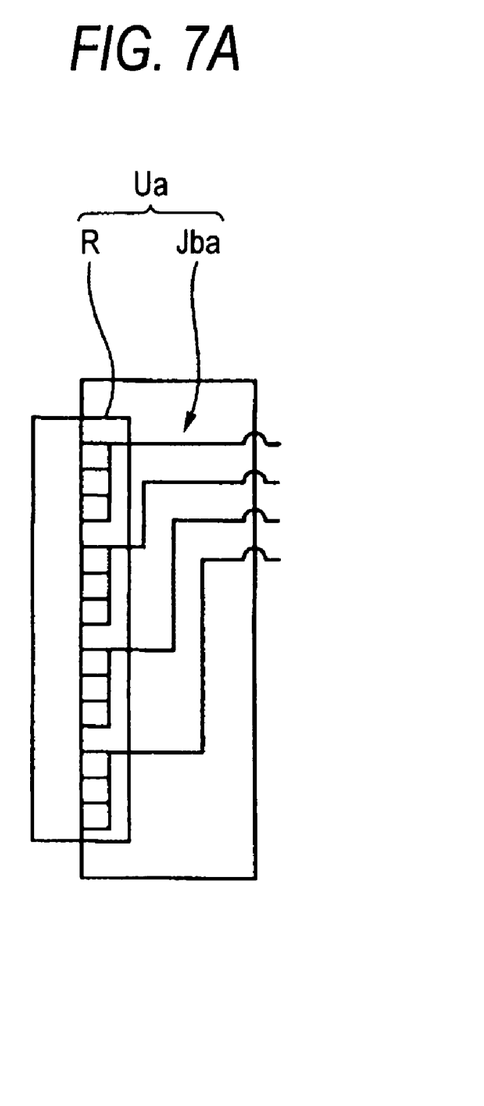
FIG. 7 is a diagram illustrating partial configuration of the relay connection unit.
Figure 7B:
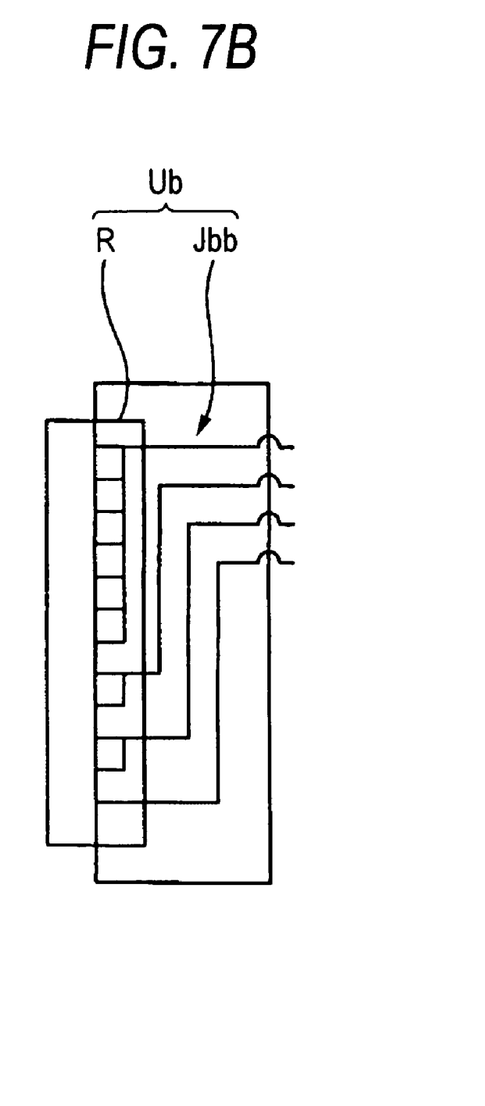

The branch connection unit Jb, with reception connectors R integrally formed, constitutes a connector unit U. Accordingly, as shown in FIGS. 7A and 7B, by providing a number of connector units Ua, Ub . . . having branch connection unit Jba, Jbb in which different branching patterns between the reception connectors R and the vehicle-mounted LAN communication units 10 are provided, and by selecting and connecting adequate one of the connector units Ua, Ub . . . to the vehicle-mounted LAN communication units 10 for implementation, the relay connection unit 1b becomes applicable to different vehicle-mounted LAN architectures.

Figure 8:
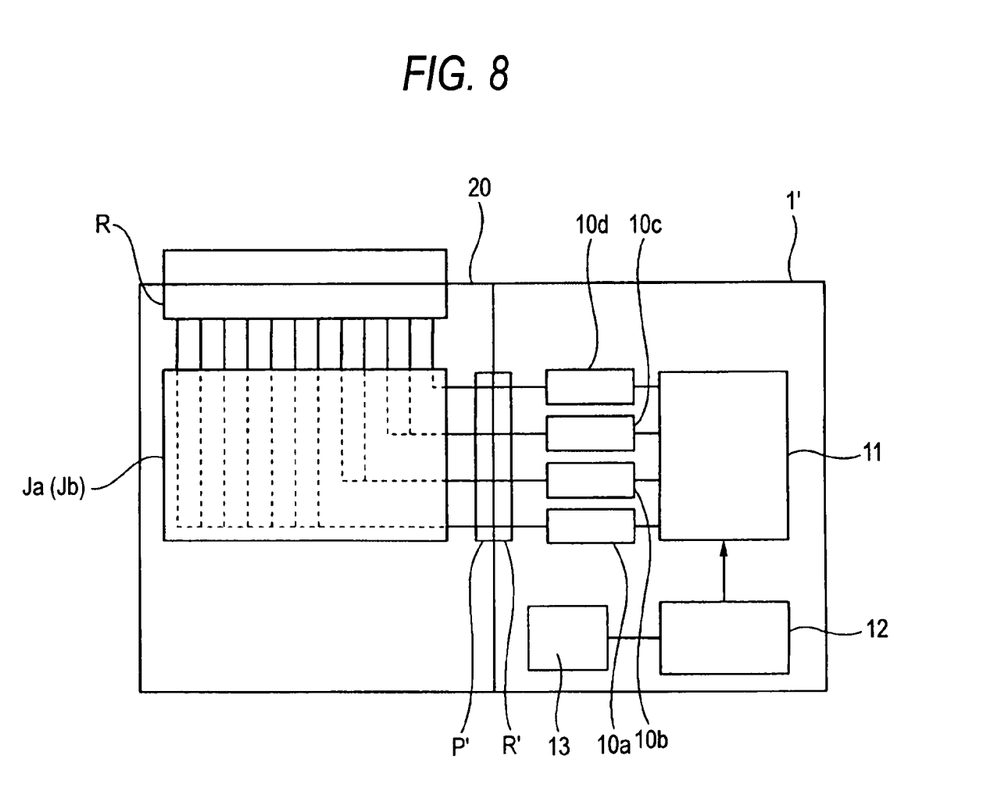
FIG. 8 is a diagram showing an electrical configuration of a junction connector according to the third embodiment of the invention.
Figure 9:
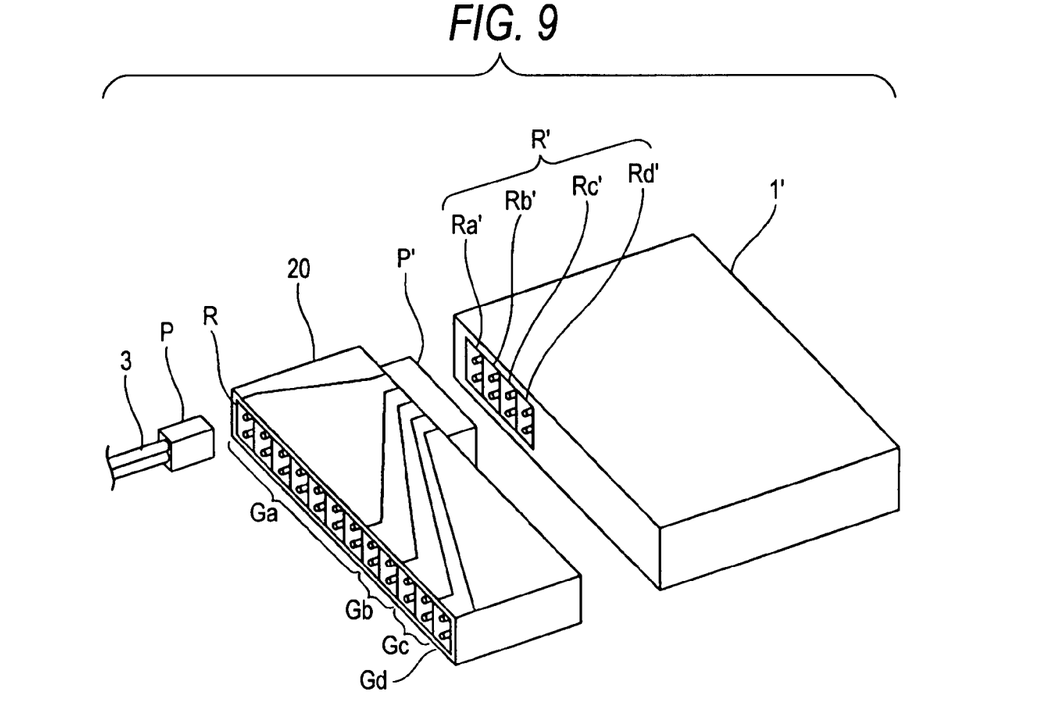
FIG. 9 is a diagram illustrating structural configuration of the junction connector.

FIGS. 8 and 9 are diagrams illustrating a third embodiment of the invention. In the following description, those members having identical reference numerals are identical or equivalent members, thus detailed descriptions thereof will be omitted.

In FIG. 8, reference numeral 20 represents a junction connector directly connected to the relay connection unit 1, and the electrical configuration thereof is the branch connection unit Ja in the relay connection unit 1a and the vehicle-mounted LAN communication units 10 shown in FIG. 1 provided with a removable connector therebetween. It should be understood that the branch connection unit Ja may be replaced by the branch connection unit Jb made of conductors shown in FIGS. 6 and 7.

FIG. 9 is a structural configuration of the junction connector 20 of the third embodiment. The junction connector 20 includes unit-side insertion connectors P' configured to be able to connect, in a batch, unit-side reception connectors Ra' to Rd' (where it is not necessary to make distinction, they will hereinafter be referred by a reference symbol "R'"), reception connectors R that can respectively connect insertion connectors P of a plurality of communication lines 3, and the unit-side reception connectors Ra' to Rd' that divide the reception connectors into a plurality of groups Ga to Gd, and are corresponding to the respective groups Ga to Gd. Reference numeral 20a represents an indication shown in order to make the branch connection status of each of the reception connectors R clear.

By using the junction connector 20 of this embodiment, even when the number of the unit-side reception connectors R' of the relay connection unit 1' is not enough, it is possible to obtain enough number of reception connectors R. Thus, the routing of a harness can be easily achieved. Furthermore, by providing several junction connectors having different branch-connection, it is possible to accommodate it to the state of the vehicle-mounted LAN to which the relay connection unit 1' is placed.

Figure 10:
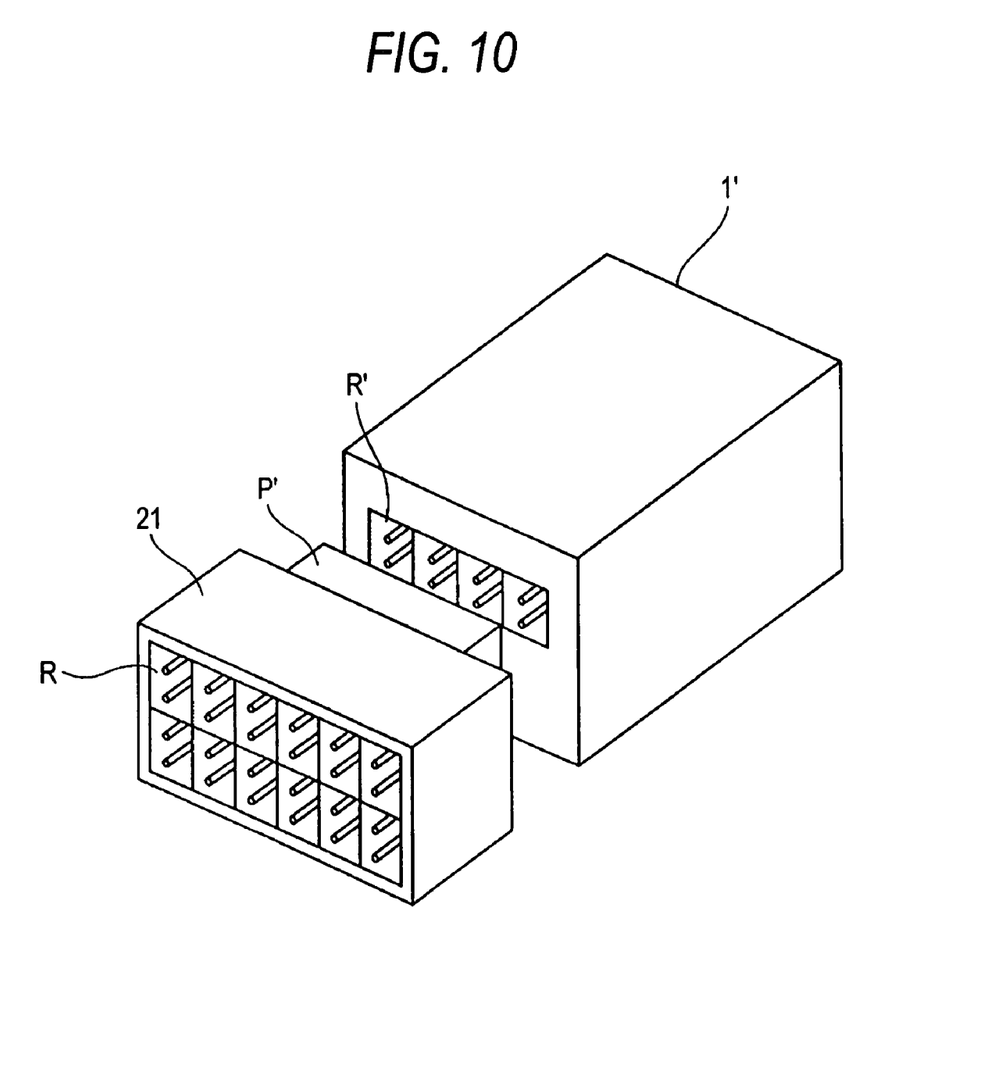
FIG. 10 is a diagram illustrating a modified version of the junction connector.

FIG. 10 is a diagram showing the architecture of a junction connector R which is a modified version of FIG. 9. By arranging the reception connectors R in a plurality of rows as shown in FIG. 10, the reception connectors R may be arranged in a compact manner.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A relay connection unit comprising:
reception connectors to which a plurality of insertion connectors of communication lines can respectively be connected;
a branch connection unit that branch-connects the communication lines through the reception connectors so as to divide the reception connectors into a plurality of groups;
a plurality of vehicle-mounted LAN communication units each connected to the corresponding group of the reception connectors through the branch connection unit, and configured to transmit/receive messages; and
a relay processing unit that relays an incoming message received through one of the vehicle-mounted LAN communication units to another of the vehicle-mounted LAN communication units in accordance with a relaying destination, wherein the branch connection unit is a matrix circuit in which switching circuits are arranged in lines between first conductors connected to the reception connectors and second conductors connected to the vehicle-mounted LAN communication units, the switching circuits being configurable to pass/block electrical signals bi-directionally.

2. The relay connection unit according to claim 1, wherein the branch connection unit comprises a matrix circuit, the matrix circuit including:
first wirings connected to the reception connectors;
second wirings connected to the vehicle-mounted LAN communication units; and
switching circuits arranged in lines between the first wirings and the second wirings so as to pass/block electrical signals bi-directionally.

3. The relay connection unit according to claim 2, further comprising:
a connection adjustment unit that monitors communication status of messages via the second conductors, and changes the setting of corresponding one of the switching circuits to dynamically adjust groupings of the reception connectors when the status of communications using any of the second wiring degrades.

4. The relay connection unit according to claim 1, wherein the branch connection unit comprises:
first wirings connected to the reception connectors; and
second wirings connected to the vehicle-mounted LAN communication units.

5. The relay connection unit according to claim 1, further comprising:
a connector provided between the branch connection unit and the vehicle-mounted LAN communication unit such that the branch connection unit is attachable to and detachable from the vehicle-mounted LAN communication unit and the relay processing unit.

6. A junction connector comprising:
reception connectors to which a plurality of insertion connectors of communication lines can respectively be connected;
a branch connection unit that branch-connects the communication lines through the reception connectors so as to divide the reception connectors into a plurality of groups; and
unit-side insertion connectors each connected to a corresponding group of the reception connectors through the branch connection unit, wherein the unit-side insertion connectors are connected to unit-side reception connectors provided on a relay connection unit to be connected to the junction connector, and the branch connection unit is a matrix circuit in which switching circuits are arranged in lines between first conductors connected to the reception connectors and second conductors connected to the unit-side insertion connectors, the switching circuits being configurable to pass/block electrical signals bi-directionally.

* * * * *